(12) United States Patent
Kraiss (10) Patent No.: US 7,848,909 B2
(45) Date of Patent: Dec. 7, 2010

(54) COMPUTING PREDICTION RESULTS DURING AN UNBROKEN ONLINE INTERACTIVE SESSION

(75) Inventor: Achim Kraiss, Lautertal (DE)

(73) Assignee: SAP Aktiengesellschaft, Walldorf (DE)

( * ) Notice: Subject to any disclaimer, the term of this patent is extended or adjusted under 35 U.S.C. 154(b) by 549 days.

(21) Appl. No.: 10/757,651

(22) Filed: Jan. 14, 2004

(65) Prior Publication Data

US 2005/0154687 A1 Jul. 14, 2005

(51) Int. Cl.
*G06G 7/48* (2006.01)
*G06G 7/00* (2006.01)
*G06F 9/45* (2006.01)
*G06E 1/00* (2006.01)
*G06E 3/00* (2006.01)

(52) U.S. Cl. .................... 703/6; 703/22; 706/21; 707/600

(58) Field of Classification Search ............. 703/22, 703/6; 706/21; 707/6, 600
See application file for complete search history.

(56) References Cited

U.S. PATENT DOCUMENTS

| | | | | |
|---|---|---|---|---|
| 5,034,914 A * | 7/1991 | Osterlund | ............... | 710/52 |
| 5,297,124 A * | 3/1994 | Plotkin et al. | ............... | 360/49 |
| 5,684,872 A * | 11/1997 | Flockhart et al. | ....... | 379/266.08 |
| 5,868,669 A | 2/1999 | Iliff | | |
| 6,070,224 A * | 5/2000 | LeCrone et al. | ............. | 711/112 |
| 6,260,110 B1 * | 7/2001 | LeCrone et al. | ............. | 711/112 |
| 6,282,531 B1 | 8/2001 | Haughton et al. | | |
| 6,400,996 B1 * | 6/2002 | Hoffberg et al. | ............. | 700/83 |
| 6,556,958 B1 * | 4/2003 | Chickering | ............. | 703/2 |
| 6,744,729 B2 * | 6/2004 | Tinsley et al. | ............. | 370/229 |
| 6,836,773 B2 * | 12/2004 | Tamayo et al. | ............. | 707/6 |
| 7,024,410 B2 * | 4/2006 | Ito et al. | ............. | 707/9 |
| 7,117,208 B2 * | 10/2006 | Tamayo et al. | ............. | 707/6 |
| 7,200,546 B1 * | 4/2007 | Nourmohamadian et al. | . | 703/24 |
| 7,370,316 B2 * | 5/2008 | Kraiss et al. | ............. | 717/100 |
| 7,379,926 B1 * | 5/2008 | Belniak et al. | ............. | 706/46 |
| 2002/0035664 A1 * | 3/2002 | Yates et al. | ............. | 711/111 |
| 2002/0083067 A1 * | 6/2002 | Tamayo et al. | ............. | 707/100 |
| 2002/0087385 A1 * | 7/2002 | Vincent | ............. | 705/10 |
| 2002/0091875 A1 * | 7/2002 | Fujiwara et al. | ............. | 709/330 |
| 2002/0138409 A1 * | 9/2002 | Bass | ............. | 705/38 |
| 2002/0194096 A1 * | 12/2002 | Falcone et al. | ............. | 705/35 |

(Continued)

OTHER PUBLICATIONS

Wikipedia, definition for "Computer hardware" edited by Robert Merkel (Talk | contribs) at 05:42, Jan. 10, 2003. http://en.wikipedia.org/w/index.php?title=Computer_hardware&oldid=677713.*

(Continued)

*Primary Examiner*—David Silver
(74) *Attorney, Agent, or Firm*—Fish & Richardson P.C.

(57) ABSTRACT

One embodiment of the invention provides a computer-implemented method for providing prediction results to an application system during an interactive session with a user. In this embodiment, the method includes receiving a first set of input values from the application system, using a data mining model along with the first set of input values to compute a first prediction result, and saving state information generated from the computation of the first prediction result. The method further includes receiving a second set of input values from the application system, and using the data mining model along with the state information and the second set of input values to compute a second prediction result.

21 Claims, 3 Drawing Sheets

U.S. PATENT DOCUMENTS

| | | | | |
|---|---|---|---|---|
| 2003/0043815 A1* | 3/2003 | Tinsley et al. | ......... | 370/395.21 |
| 2003/0088565 A1* | 5/2003 | Walter et al. | ................... | 707/6 |
| 2003/0128454 A1* | 7/2003 | Basham et al. | ............... | 360/69 |
| 2004/0015386 A1* | 1/2004 | Abe et al. | ..................... | 705/10 |
| 2004/0034558 A1* | 2/2004 | Eskandari | ................... | 705/10 |
| 2004/0034570 A1* | 2/2004 | Davis | ......................... | 705/26 |
| 2004/0068476 A1* | 4/2004 | Provost et al. | ............... | 706/45 |
| 2004/0141508 A1* | 7/2004 | Schoeneberger et al. | .... | 370/401 |
| 2005/0102292 A1* | 5/2005 | Tamayo et al. | ............... | 707/10 |

OTHER PUBLICATIONS http://www.sas.com/news/preleases/111802/news2.html—"SAS Acquires Technology to Track Customer Behavior In Real-Time," printed from the Internet Apr. 18, 2003, 2 ps.

"Welcome to The Real-Time Enterprise," *PeopleSoft, Inc.*, Copyright 2003, 8 ps.

"DataDistilleries Real-Time Suite," *DataDistilleries*, Copyright 2002, 2 ps.

"DataDistilleries Analytical Suite," *DataDistilleries*, Copyright 2002, 2 ps.

http://www.epiphany.com/news/2002press/2002_08_27.html—E.Piphany—"E.Piphany Real-Time Wins CRM Excellence Award from Customer Inter@ction Solutions Magazine," printed from the Internet Apr. 18, 2003, 2 ps.

http://www.verilytics.com/products/index.html—"Verilytics Products," printed from the Internet Apr. 18, 2003, 2 ps.

http://www.dmg.org/faq.htm—"Frequently Asked Questions," printed from the Internet Apr. 18, 2003, 2 ps.

PowerPoint Presentation, Analytical CRM, *SAP AG*, 24 ps.

Wikipedia. "20Q" [Retrieved on Nov. 16, 2009] Retrieved from the Internet <URL: http://en.wikipedia.org/w/index.php?title=20Q&oldid=324094593>.

Wikipedia. "Expert System" [Retrieved on Nov. 16, 2009] Retrieved from the Internet <URL: http://en.wikipedia.org/w/index.php?title=Expert_system&oldid=323236840>.

* cited by examiner

COMPUTING PREDICTION RESULTS DURING AN UNBROKEN ONLINE INTERACTIVE SESSION

TECHNICAL FIELD

This invention relates to the computation of prediction results in computer systems.

BACKGROUND

In a typical real-time analytics system, an application system provides customer transaction data to an analytical engine that is capable of executing analytical tasks. An example of such an analytical engine is a prediction engine that provides useful, predictive output relating to a transaction with a customer. An analytical engine is capable of processing real-time data from a customer to execute analytical tasks and to generate output in real time. Often, the analytical engine will use the real-time data in coordination with a data mining model to generate a predictive output. A data mining model typically contains rules and patterns derived from historical data that has been collected, synthesized, and formatted.

In many instances, a predictive output generated upon execution of an analytical task is fed into a business rule engine. The business rule engine will use the predictive output in conjunction with its rule set to determine if certain events should be triggered in the application system. For example, the business rule engine may determine that a special promotional offer should be provided to a particular customer given the content of the predictive output and the nature of the transaction with that customer. In some instances, the application system may directly process the predictive output.

Typically, the application system will need predictive output in a short period of time. For example, if a call-center agent is using a customer interaction center application system to interact with a customer online, the agent will typically need predictive output quickly in order to effectively interact with the customer. However, a prediction engine used in a typical analytics system may be required to wait until the application system has provided all of the input parameters that are required for task execution before the engine is able to execute a given prediction task during a customer interactive session. This can result in performance degradation.

SUMMARY

Various embodiments of the invention are provided herein. One embodiment of the invention provides a computer-implemented method for providing prediction results to an application system during an interactive session with a user. In this embodiment, the method includes receiving a first set of input values from the application system, using a data mining model along with the first set of input values to compute a first prediction result, and saving state information generated from the computation of the first prediction result. The method further includes receiving a second set of input values from the application system, and using the data mining model along with the state information and the second set of input values to compute a second prediction result.

Certain embodiments of the invention may have many benefits and advantages. For example, prediction engines may be capable of quickly executing prediction tasks and generating predictive output by making use of previously computed results. These previously computed results can be reused by the prediction engines to expedite the execution of subsequent prediction tasks.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
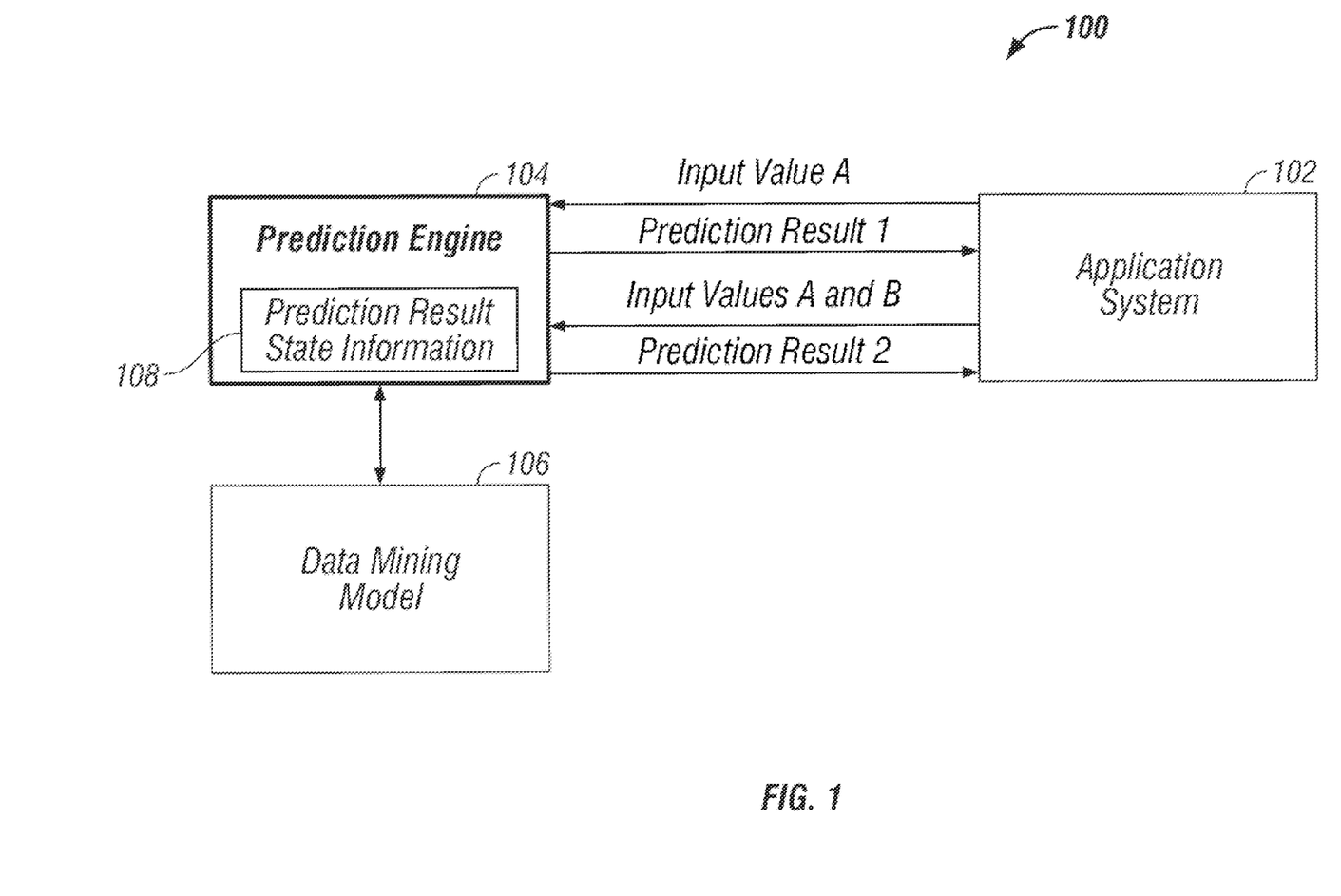
FIG. 1 is a block diagram of a computing system that may be used for providing prediction results to an application system during an interaction with a user, according to one embodiment.

FIG. 1 is a block diagram of a computing system 100 that may be used for providing prediction results to an application system 102 during an interaction with a user, such as a customer. In the example shown in FIG. 1, the computing system 100 includes an application system 102, a prediction engine 104, and a data mining model 106. The prediction engine 104 is capable of using the data mining model 106 to compute prediction results. As shown in FIG. 1, the prediction engine 104 receives a first set of input values. This first set includes "Input Value A." The prediction engine 104 then uses the data mining model 106 along with "Input Value A" to compute a first prediction result "Prediction Result 1", which is sent back to the application system 102. The prediction engine 104 saves state information that is generated from the computation of "Prediction Result 1" as prediction result state information 108. Subsequently, the prediction engine 104 receives a second set of input values. This second set includes "Input Value A" and "Input Value B." The prediction engine 104 then uses the data mining model 106 along with the state information 108, "Input Value A" and "Input Value B" to compute a second prediction result "Prediction Result 2", which is sent back to the application system 102.

During operation, the prediction engine 104 interacts with both the application system 102 and the data mining model 106. The application system 102 includes various run-time applications. In one embodiment, these applications are software applications running in a customer relationship management (CRM) environment, and may include customer interaction center or sales applications. In one embodiment, the application system 102 may also include various engines and repositories used for collecting and storing information, such as customer or key performance indicator (KPI) information. The application system 102 sends requests to the prediction engine 104 for executing prediction tasks. These requests may include one or more input values that are used during task execution. For example, as shown in FIG. 1, the application system 102 sends the input values "Input Value A" and "Input Value B" to the prediction engine 104. In one embodiment, the application system 102 provides these values to the prediction engine 104 when they are available. For example, a call-center agent using the application system 102 may first obtain a customer's name while interacting with the customer during a session. This name could be provided to the prediction engine 104 as "Input Value A" as part of a first request. At a later point in time, the application system 102 may identify the customer's income level and provide this information to the prediction engine 104 as "Input Value B." The application system 102 may obtain information about the customer's income level as a result of direct interaction with the customer, or may obtain the information from other sources using the customer's name as input. For example, the application system 102 may use the customer's name to retrieve the customer's income level from an external repository or database system. In the example shown in FIG. 1, the application system 102 sends both "Input Value A" and "Input Value B" to the prediction engine 104 in a second request. However, in one embodiment, the application system 102 may only need to provide "Input Value B" with this second request, since "Input Value A" has previously been provided. In this fashion, the application system 102 is capable of providing input information to the prediction engine 104 as it becomes available. The application system 102 is capable of sending multiple requests to the prediction engine 104, wherein each request includes input information. In one embodiment, the application system 102 sets a timeout period for each request to determine how long it will wait for a prediction result from the prediction engine 104.

Once the prediction engine 104 has received the input values from the application system 102, it is capable of using those values with the data mining model 106, along with any previously generated state information, to execute a prediction task. The data mining model 106 typically contains rules and patterns derived from historical data that has been collected, synthesized, and formatted. The prediction engine 104 is capable of generating predictive output by using the rules and patterns of the data mining model with any existing state information and the input values that were provided by the application system 102. In the example shown in FIG. 1, the prediction engine 104 generates predictive output by computing prediction results. For example, the prediction engine 104 may compute a prediction result relating to the probability that a customer will churn, or switch product/service/etc. providers. As shown in FIG. 1, the prediction engine 104 computes a first prediction result "Prediction Result 1" by using "Input Value A" with the data mining model 106. The prediction engine 104 then saves prediction result state information 108 generated from the computation of "Prediction Result 1" for later use during subsequent computations. Although the "Prediction Result 1" may be of lower quality, since it is based only on "Input Value A," it can be made immediately available to the application system 102. A call-center agent using the application system 102 may need prediction information quickly while interacting with a customer during an interactive session. This agent may make immediate use of "Prediction Result 1". For example, if "Prediction Result 1" indicates that there is a possibility of customer churn, the call-center agent using the application 102 may want to offer the customer a special promotional discount.

The prediction engine 104 is also capable of computing a second, subsequent prediction result "Prediction Result 2" by using "Input Value A" and "Input Value B," along with the data mining model 106 and the state information 108 generated during the computation of "Prediction Result 1". The state information 108 may include intermediate results, probabilities, identifiers, etc. that are generated during the computation of "Prediction Result 1." The prediction engine 104 is able to compute "Prediction Result 2" once "Input Value B" has been made available and is provided to the prediction engine 104 by the application system 102. "Prediction Result 2" is sent back to application system 102. "Prediction Result 2" may be of higher quality than "Prediction Result 1", because it is based on a larger set of input values. For example, "Prediction Result 1" may indicate that there is a 50% probability of customer churn, while "Prediction Result 2" may indicate that there is a 90% probability of customer churn. The call-center agent may quickly obtain "Prediction Result 1" and decide to offer the customer the promotional discount based on the 50% probability of churn. However, when the call-center agent later obtains "Prediction Result 2," he or she may make additional offers to the customer based on the 90% probability of churn. In this fashion, the call-center agent is able to make use of the incremental prediction results as they are computed by the prediction engine 104 and sent back to the application system 102.

In the example shown in FIG. 1, the application system 102 includes both "Input Value A" and "Input Value B" in the second request that is sent to the prediction engine 104. In another embodiment, the application system 102 may only include "Input Value B" in this second request, given that "Input Value A" had been previously provided in the first request.

Figure 2:
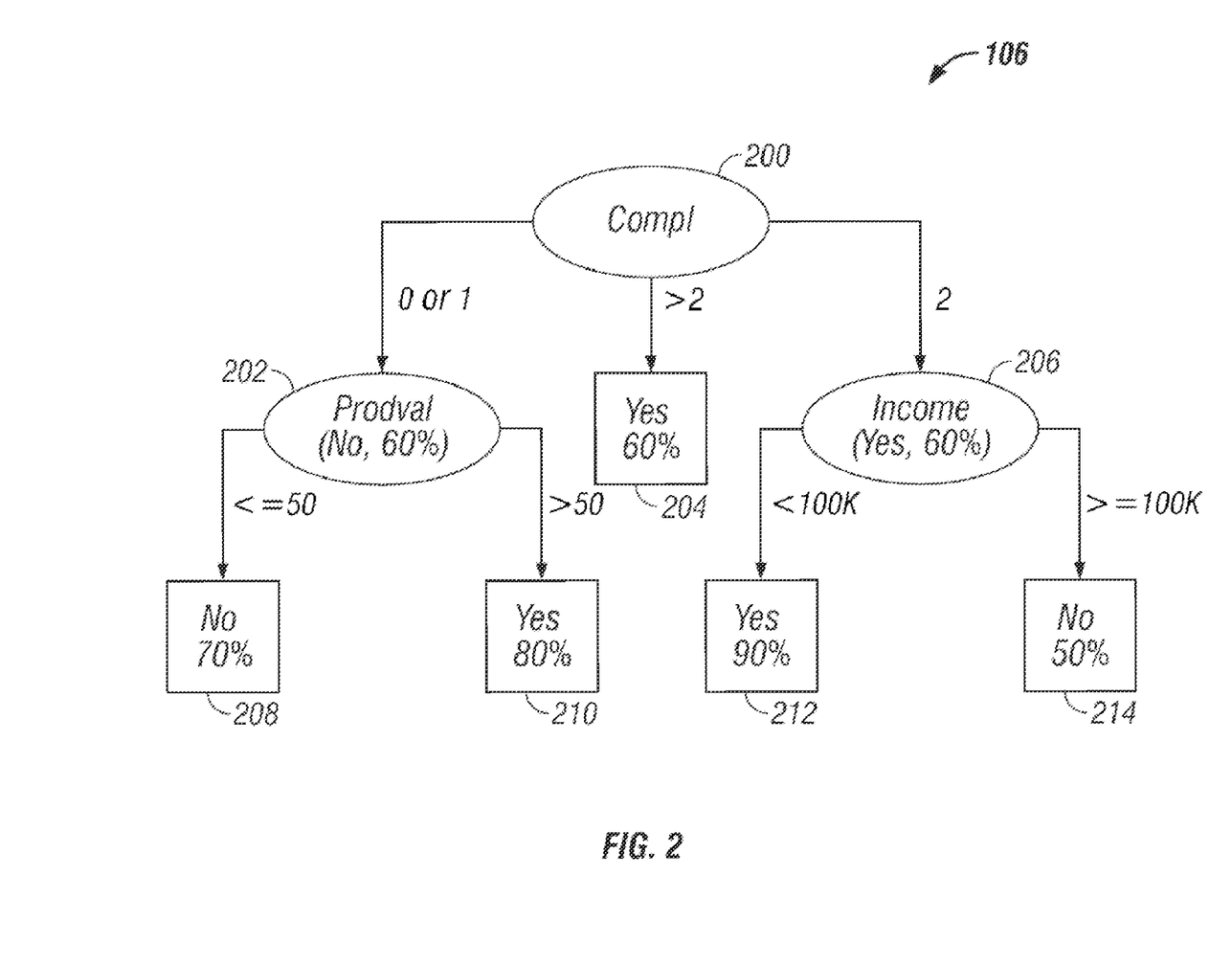
FIG. 2 is a diagram of one embodiment of the data mining model shown in FIG. 1.

FIG. 2 is a diagram of one embodiment of the data mining model 106 shown in FIG. 1. In this embodiment, the data mining model 106 is a decision tree model that is used by the prediction engine 104 for the prediction of customer churn ("Yes", "No") based on a number of customer complaints ("COMPL"), a customer's income ("INCOME"), and a value of the customer's damaged product ("PRODVAL"). Customer churn occurs when a customer switches providers. Typically, a company will want to minimize customer churn. If there is a possibility of customer churn in a certain scenario, the company may decide to make special offers to the customer to retain that customer's business.

In the example shown in FIG. 2, it is assumed that the application system 102 provides the input values "COMPL", "INCOME", and "PRODVAL" at various points in time to the prediction engine 104 during a single interactive session with a customer. The application system 102 provides these input values to the prediction engine 104 as they become available. The prediction engine 104 then uses one or more of these values, along with the model 106 and any previously generated state information, to compute prediction results for customer churn, and sends these prediction results back to the application system 102.

During the customer interactive session, the application system 102 may obtain customer identification information directly from the customer and use this information to obtain the value of "COMPL" from an internal or external repository system. The application system 102 then sends the value of "COMPL" to the prediction engine 104. The prediction engine 104 uses the value of "COMPL" with the model 106 at a node 200. If the value of "COMPL" is greater than 2 (i.e., if there are more than 2 complaints), the prediction engine 104 computes a prediction result at a node 204 indicating that the customer is likely to churn ("Yes") with a probability of 60%. The prediction result at the node 204 is based solely on the value of "COMPL", and is independent of the values of "PRODVAL" and "INCOME" (which have not yet been provided to the prediction engine 104). The prediction engine from the node 104 is able to send the prediction result 204 back to the application system 102, even though it has not yet received the values of "PRODVAL" and "INCOME".

Each time the application system 102 provides additional input values as they become available, such as "PRODVAL" or "INCOME", the prediction engine 104 does not need to make any previously made computations again. Instead, the prediction engine 104 may use the result specified at the node 204 from the previous computation and send this result back to the application system 102.

If the value of "COMPL" initially provided by the application system 102 is either 0 or 1, the prediction engine 104 traverses the outer left branch to a node 202. As the value of "PRODVAL" has yet to be provided by the application system 102, the prediction engine 104 computes an intermediate prediction result specified at the node 202 indicating that the customer is not likely to churn ("No") with a probability of 60%. The prediction engine 104 is capable of sending this intermediate prediction result back to the application system 102. Although this intermediate result may be of slightly lower quality due to the fact that it is based solely on the value of "COMPL", the application system 102 may be capable of making efficient use of this intermediate result during the interactive session with the customer. The application system 102 will later provide the input value for "PRODVAL" after it has become available. To optimize the processing performance for the next prediction, the prediction engine 104 can keep a pointer to the node 202, as further processing will start from this node when the value of "COMPL" is either 0 or 1. By keeping a pointer to this node, the prediction engine 104 is able to maintain state information about the previously computed prediction result. If the value of "PRODVAL" is less than or equal to 50, the prediction engine 104 can make use of the previous computation and directly traverse down to the left from the node 202. The prediction engine 104 computes a prediction result at a node 208 indicating that the customer is not likely to churn ("No") with a probability of 70%. If the value of "PRODVAL" is greater than 50, the prediction engine 104 computes a prediction result at a node 210 indicating that the customer is likely to churn ("Yes") with a probability of 80%. The prediction engine 104 may then send the prediction result computed at the node 208 or 210 to the application system 102. The value of "INCOME" has no influence on the computations made by the prediction engine 104 when processing information at the node 202. If the prediction engine 104 receives a value for "INCOME" when it is currently at the node 202, it does not need to make any additional computations.

If the value of "COMPL" initially provided by the application system 102 is equal to 2, the prediction engine 104 traverses the outer right branch to a node 206. As the value of "INCOME" has yet to be provided by the application system 102, the prediction engine 104 computes an intermediate prediction result specified at the node 206 indicating that the customer is likely to churn ("Yes") with a probability of 60%, and can provide this intermediate result to the application system 102. The application system 102 will later provide the input value for "INCOME". To optimize the processing performance for the next prediction, the prediction engine 104 can keep a pointer to the node 206, as further processing will start from this node when the value of "COMPL" is 2. If the value of "INCOME" is less than 100K, the prediction engine 104 can make use of the previous computation and directly traverse down to left from the node 212. The prediction engine 104 computes a prediction result at a node 212 indicating that the customer is likely to churn ("Yes") with a probability of 90%. If the value of "INCOME" is greater than or equal to 100K, the prediction engine 104 computes a prediction result at a node 214 indicating that the customer is not likely to churn ("No") with a probability of 50%. The prediction engine 104 may then send the prediction result computed at the node 212 or 214 back to the application system 102. The value of "PRODVAL" has no influence on the computations made by the prediction engine 104 when processing information at the node 206. If the prediction engine 104 receives a value for "PRODVAL" when it is currently at the node 206, it does not need to make any additional computations.

FIG. 2 shows a diagram of just one embodiment of the data mining model 106 that is shown in FIG. 1. In other embodiments, the data mining model 106 may have various different forms. For example, in one alternate embodiment, the data mining model 106 is a Naive Bayes model. A Naive Bayes model uses statistics and is based on conditional probabilities. In one example that utilizes a Naive Bayes model, the application system 102 provides the prediction engine 104 with the input values "COMPL" and "PRODVAL". The data set used for the training, or creation, of the Naive Bayes mining model 106 has twenty-one records, nine of which corresponded to churning customers (churn="Yes"), and twelve of which corresponded to non-churning customers (churn="No"). Out of the nine churning customers, three had an associated "COMPL" value of 0 or 1, four had an associated "COMPL" value of 2, two had an associated "COMPL" value of greater than 2, two had an associated "PRODVAL" value of less than or equal to 50, and seven had an associated "PRODVAL" value of greater than 50. Out of the twelve non-churning customers, three had an associated "COMPL" value of 0 or 1, two had an associated "COMPL" value of 2, seven had an associated "COMPL" value of greater than 2, eight had an associated "PRODVAL" value of less than or equal to 50, and four had an associated "PRODVAL" value of greater than 50. These values are shown below in Table 1.

TABLE 1

|         |        | Yes  | No   |
|---------|--------|------|------|
| COMPL   | 0 or 1 | 3/9  | 3/12 |
|         | 2      | 4/9  | 2/12 |
|         | >2     | 2/9  | 7/12 |
| PRODVAL | <=50   | 2/9  | 8/12 |
|         | >50    | 7/9  | 4/12 |

During operation, the application system 102 may initially only provide an input value for "COMPL." At this point, prediction engine 104 uses the model 106 to compute an initial prediction result for customer churn based on conditional probabilities and then sends this result back to the application system 102. For example, if the value of "COMPL" is 2, then the prediction engine 104 can make the following calculations for an initial prediction result relating to customer churn:
  Conditional probability of Customer Churn ("Yes")=4/9*9/21=0.190
  Conditional probability of No Customer Churn ("No")=2/12*12/21=0.095
  Initial Prediction Result=Customer Churn ("Yes") with (0.190/(0.190+0.095))*100%=66% confidence (i.e., probability)

The intermediate probabilities of 0.190 and 0.095 can be kept in memory for the next prediction as state information. When the application system 102 later provides the value for "PRODVAL", the prediction engine 104 can use these stored results to quickly compute a second prediction result without having the redo the initial calculation. The prediction engine 104 can then send this second prediction result back to the application system 102. This second result may be of higher confidence, because it is based on a larger set of input values. Continuing with the example above, if the value of "PRODVAL" provided by the application system 102 is greater than 50, the prediction engine 104 can make the following calculations for a second prediction result relating to customer churn:
  Conditional probability of Customer Churn ("Yes")=7/9*0.190=0.148
  Conditional probability of No Customer Churn ("No")=4/12*0.095=0.032

Second Prediction Result=Customer Churn ("Yes") with (0.148/(0.148+0.032))*100%=82% confidence (i.e., probability)

Figure 3:
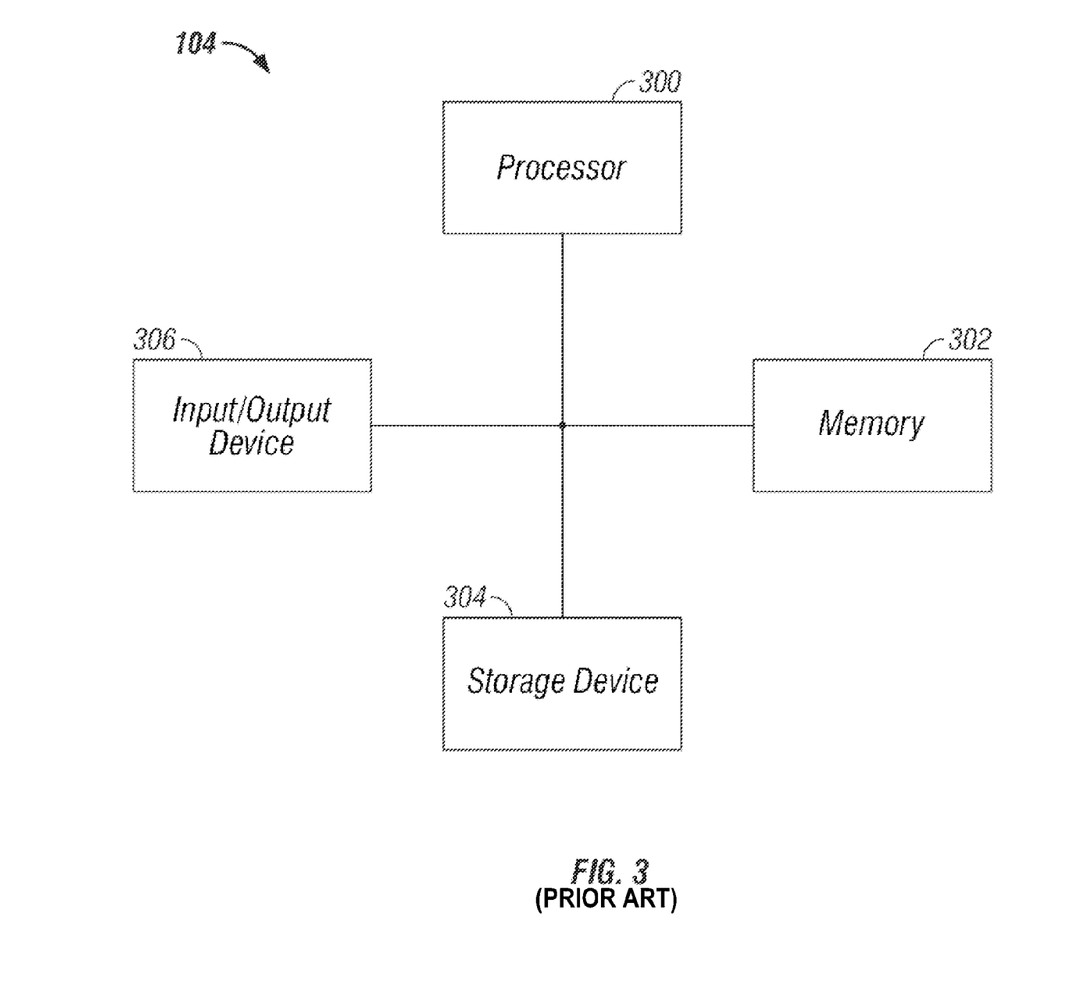
FIG. 3 is a block diagram of one embodiment of the prediction engine shown in FIG. 1.

FIG. 3 is a block diagram of one embodiment of the prediction engine 104 shown in FIG. 1. In this embodiment, the prediction engine 104 includes a processor 300, a memory 302, a storage device 304, and an input/output device 306. Each of the components 300, 302, 304, and 306 are interconnected using a system bus. The processor 300 is capable of processing instructions for execution within the prediction engine 104. In one embodiment, the processor 300 is a single-threaded processor. In another embodiment, the processor 300 is a multi-threaded processor. The processor 300 is capable of processing instructions stored in the memory 302 or on the storage device 304.

The memory 302 stores information within the prediction engine 104. In one embodiment, the memory 302 is a computer-readable medium. In one embodiment, the memory 302 is a volatile memory unit. In another embodiment, the memory 302 is a non-volatile memory unit. In one embodiment, the prediction engine 104 may load portions of the data mining model 106 (shown in FIG. 1) into the memory 302 for use during execution of prediction tasks.

The storage device 304 is capable of providing mass storage for the prediction engine 104. In one embodiment, the storage device 304 is a computer-readable medium. In various different embodiments, the storage device 304 may be a floppy disk device, a hard disk device, an optical disk device, or a tape device. In certain embodiments, the prediction engine 104 may not include the storage device 304.

The input/output device 306 provides input/output operations for the prediction engine 104. In one embodiment, the input/output device 306 includes a keyboard and/or pointing device. In one embodiment, the input/output device 306 includes a display unit. In certain embodiments, the prediction engine 104 may not include the input/output device 306.

A number of embodiments of the invention have been described. Nevertheless, it will be understood that various modifications may be made without departing from the spirit and scope of the invention. Accordingly, other embodiments are within the scope of the following claims.

What is claimed is:

1. A computer-implemented method for providing predictive information to a human user during the course of conducting an unbroken online interactive session between the human user and a customer, during which interactive session the human user uses an application computing system comprising one or more software applications that run in a computing environment, the application computing system connected to communicate with a prediction computing engine, the computer-implemented method comprising:

during the course of the interactive session between the human user and the customer, the application computing system sending a first electronic request to the prediction computing engine to perform a first prediction determination of a probability that the customer will take a predefined action, the first electronic request including a first input value set including information that was provided by the customer during the interactive session;

in response to the first electronic request, the prediction computing engine using the first input value set to perform the first prediction determination, electronically storing first state information generated as part of the first prediction determination, providing to the application computing system a first prediction result of the first prediction determination, and displaying during the course of the interactive session the first prediction result on a display device to the human user;

at a later point in time during the interactive session between the human user and the customer when additional information about the customer becomes available, the additional information being provided by the customer during the interactive session, the application computing system sending a second electronic request to the prediction computing engine to perform a second prediction determination of a probability that the customer will take the predefined action, the second electronic request including a second input value set comprising at least information derived from the additional information about the customer that became available at the application system after the sending of the first request; and in response to the second request and during the interactive session, the prediction computing engine performing the second prediction determination using both of the stored first state information generated as part of the first prediction determination and the second input value set derived from the additional information about the customer that became available at the application system after the sending of the first request, the first state information being used to avoid calculations being performed in the second prediction determination that would duplicate calculations that were already performed in the first prediction determination, providing to the application computing system a second prediction result of the second prediction determination, and displaying during the course of the interactive session the second prediction result on a display device to the human user.

2. The computer-implemented method of claim 1, wherein the second input value set includes both the first input value set and an additional set of input values, and wherein the method comprises using a decision tree along with the stored state information and the additional set of input values to compute the second prediction result.

3. The computer-implemented method of claim 1, wherein the first input value set includes at least two input values.

4. The computer-implemented method of claim 1, wherein the second input value set includes at least two input values.

5. The computer-implemented method of claim 1, wherein the first state information includes intermediate probability information.

6. The computer-implemented method of claim 1, wherein the first and second prediction results each specify a probability of customer churn.

7. The computer-implemented method of claim 1, wherein the second input value set is provided to the application computing system by the human user as a result of interaction by the human user with the customer.

8. A computer-readable storage medium comprising computer-executable instructions that when executed perform a computer-implemented method for providing predictive information to a human user during the course of conducting an unbroken online interactive session between the human user and a customer, during which interactive session the human user uses an application computing system comprising one or more software applications that run in a computing environment, the application computing system connected to communicate with a prediction computing engine, the computer-implemented method comprising:

during the course of the interactive session between the human user and the customer, the application computing system sending a first electronic request to the prediction computing engine to perform a first prediction determination of a probability that the customer will take a predefined action, the first electronic request including a first input value set including information that was provided by the customer during the interactive session;

in response to the first electronic request, the prediction computing engine using the first input value set to perform the first prediction determination, electronically storing first state information generated as part of the first prediction determination, providing to the application computing system a first prediction result of the first prediction determination, and displaying during the course of the interactive session the first prediction result on a display device to the human user;

at a later point in time during the interactive session between the human user and the customer when additional information about the customer becomes available, the additional information being provided by the customer during the interactive session, the application computing system sending a second electronic request to the prediction computing engine to perform a second prediction determination of a probability that the customer will take the predefined action, the second electronic request including a second input value set comprising at least information derived from the additional information about the customer that became available at the application system after the sending of the first request; and in response to the second request and during the interactive session, the prediction computing engine performing the second prediction determination using both of the stored first state information generated as part of the first prediction determination and the second input value set derived from the additional information about the customer that became available at the application system after the sending of the first request, the first state information being used to avoid calculations being performed in the second prediction determination that would duplicate calculations that were already performed in the first prediction determination, providing to the application computing system a second prediction result of the second prediction determination, and displaying during the course of the interactive session the second prediction result on a display device to the human user.

9. The computer-readable storage medium of claim 8, wherein the second input value set includes both the first input value set and an additional set of input values, and wherein the method comprises using a decision tree along with the stored state information and the additional set of input values to compute the second prediction result.

10. The computer-readable storage medium of claim 8, wherein the first input value set includes at least two input values.

11. The computer-readable storage medium of claim 8, wherein the second input value set includes at least two input values.

12. The computer-readable storage medium of claim 9, wherein the first state information includes intermediate probability information.

13. The computer-readable storage medium of claim 8, wherein the first and second prediction results each specify a probability of customer churn.

14. The computer-readable storage medium of claim 8, wherein the second input value set is provided to the application computing system by the human user as a result of interaction by the human user with the customer.

15. A system comprising:

one or more processors; and a computer-readable medium including instructions that, when executed by the one or more processors, causes the one or more processors to perform operations for providing predictive information to a human user during the course of conducting an unbroken online interactive session between the human user and a customer, during which interactive session the human user uses an application computing system comprising one or more software applications that run in a computing environment, the application computing system connected to communicate with a prediction computing engine, the operations comprising:

during the course of the interactive session between the human user and the customer, the application computing system sending a first electronic request to the prediction computing engine to perform a first prediction determination of a probability that the customer will take a predefined action, the first electronic request including a first input value set including information that was provided by the customer during the interactive session;

in response to the first electronic request, the prediction computing engine using the first input value set to perform the first prediction determination, electronically storing first state information generated as part of the first prediction determination, providing to the application computing system a first prediction result of the first prediction determination, and displaying during the course of the interactive session the first prediction result on a display device to the human user;

at a later point in time during the interactive session between the human user and the customer when additional information about the customer becomes available, the additional information being provided by the customer during the interactive session, the application computing system sending a second electronic request to the prediction computing engine to perform a second prediction determination of a probability that the customer will take the predefined action, the second electronic request including a second input value set comprising at least information derived from the additional information about the customer that became available at the application system after the sending of the first request; and in response to the second request and during the interactive session, the prediction computing engine performing the second prediction determination using both of the stored first state information generated as part of the first prediction determination and the second input value set derived from the additional information about the customer that became available at the application system after the sending of the first request, the first state information being used to avoid calculations being performed in the second prediction determination that would duplicate calculations that were already performed in the first prediction determination, providing to the application computing system a second prediction result of the second prediction determination, and displaying during the course of the interactive session the second prediction result on a display device to the human user.

16. The system of claim 15, wherein the second input value set includes both the first input value set and an additional set of input values, and wherein the operations comprise using a decision tree along with the stored state information and the additional set of input values to compute the second prediction result.

17. The system of claim 15, wherein the first input value set includes at least two input values.

18. The system of claim 15, wherein the second input value set includes at least two input values.

19. The system of claim 15, wherein the first state information includes intermediate probability information.

20. The system of claim 15, wherein the first and second prediction results each specify a probability of customer churn.

21. The system of claim 15, wherein the second input value set is provided to the application computing system by the human user as a result of interaction by the human user with the customer.

* * * * *